United States Patent
Bradley et al.

(10) Patent No.: US 6,357,933 B1
(45) Date of Patent: Mar. 19, 2002

(54) QUICK CONNECT OPTICAL FIBER FERRULE CONNECTOR

(75) Inventors: Kelvin B. Bradley, Norcross; Gary F. Gibbs, Jonesboro; Charles O. Pierce, Alpharetta, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/281,676

(22) Filed: Mar. 30, 1999

(51) Int. Cl.[7] .............................. G02B 6/38; G02B 6/36
(52) U.S. Cl. ............................................ 385/81; 385/62
(58) Field of Search .............................. 385/28, 60, 62, 385/81, 84

(56) References Cited

U.S. PATENT DOCUMENTS

| | | | |
|---|---|---|---|
| 4,355,862 A | * 10/1982 | Kock | 385/81 |
| 4,634,214 A | 1/1987 | Cannon, Jr. et al. | 350/96.2 |
| 4,898,446 A | 2/1990 | Hinckley | 350/96.2 |
| 4,964,685 A | * 10/1990 | Savitsky et al. | 385/58 |
| 5,080,460 A | * 1/1992 | Erdman et al. | 385/83 |
| 5,082,345 A | 1/1992 | Cammons et al. | 385/60 |
| 5,212,752 A | 5/1993 | Stephenson et al. | 385/78 |
| 5,363,461 A | 11/1994 | Bergmann | 385/78 |
| 5,638,474 A | 6/1997 | Lampert et al. | 385/78 |
| 5,719,977 A | 2/1998 | Lampert et al. | 385/60 |
| 5,943,460 A | * 8/1999 | Mead et al. | 385/78 |

OTHER PUBLICATIONS

"Quick–connect fiber–optic connectors hasten fiber's jounty to the desk" Sep. 1997 LIGHTWAVE, pp.86 and 88.
"Amphenol 953 Series FiberGrip Connector"—953 Series, 2 pages, 2/97.
"3M Crimplok Connectors", 6 pages, 1995.

* cited by examiner

*Primary Examiner*—Cassandra Spyrou
*Assistant Examiner*—Jared Treas
(74) *Attorney, Agent, or Firm*—Thomas, Kayden, Horstemeyer & Risley, LLP

(57) ABSTRACT

The present invention is generally directed to a quick connect optical fiber ferrule connector that can be installed in the field without the use of adhesive or epoxy. The connector includes a ferrule having a receiving end, a terminating end, and a tapered ferrule bore disposed therein. The tapered ferrule bore has a larger diameter toward the receiving end than toward the terminating end. Also included is a barrel having a barrel bore disposed therein. The barrel is arranged and configured to receive the receiving end of the ferrule such that the barrel bore and the tapered ferrule bore are axially aligned. An insert having a receiving end, a support end, and a bore disposed therethrough is positioned such that the receiving end of the insert is disposed within the barrel bore and the support end of the insert is disposed within the tapered ferrule bore. The support end is compressible and the insert is tapered such as to correspond with the tapered ferrule bore.

4 Claims, 4 Drawing Sheets

QUICK CONNECT OPTICAL FIBER FERRULE CONNECTOR

TECHNICAL FIELD

The present invention is generally related to an optical fiber ferrule connector. More particularly, the present invention is an apparatus and method for a quick-connect optical fiber ferrule connector.

BACKGROUND OF THE INVENTION

Optical fiber connectors and splices are an essential part of optical fiber communications systems. Connectors may be used to join lengths of optical fiber into longer lengths, or to connect optical fiber to active devices such as radiation sources, detectors, or repeaters, or to passive devices such as switches or attenuators.

An optical fiber connector must meet at least two requirements. It must couple or join two optical fibers with minimum insertion loss. Secondly, it must provide mechanical stability and protection to the junction between the optical fibers in the working environment. Achieving low insertion loss in coupling two optical fibers is generally a function of the alignment of the optical fiber ends, the width of the gap between the ends, and the optical surface condition of the ends. Stability and junction protection is generally a function of connector design, such as, for example, the minimization of differential thermal expansion effects.

Many approaches to achieving fiber alignment can be found in the prior art. Among them are V-grooves, resilient ferrules, and conical bushings. A discussion of prior art connectors is provided in R. Schultz, *Proceedings of the Optical Fiber Conference,* Los Angeles (September 1982), pp. 165–170.

A further consideration in connector design is the relative ease of field installation of the connector. It is desirable that a sought-after connector be capable of being installed within a relatively short period of time without requiring special skills or manipulations not easily carried out in the field. Further, it is desired that an optical fiber connector be capable of field-terminating a length of optical fiber.

Many optical fiber connectors require the use of adhesives or epoxies in securing connector components in the field. For example, a typical connector includes a ferrule piece rigidly fixed to a connector body. Adhesive is injected into a longitudinal bore of the ferrule prior to inserting the optical fiber to be connected. A cable is received into the connector body with the enclosed fiber projecting along the longitudinal bore of the ferrule. This adhesive typically must be heat cured. As such, heat curing ovens are required in the field where the connectors are being installed and a power source for those ovens must be available. Additionally, the heat curing takes time both to heat and to cool down.

A known optical fiber connector that implements the use of adhesive is an SC connector. The SC connector includes a ferrule assembly which has a barrel with a collar at one end and an optical fiber terminating ferrule extending from the other end of the barrel. The ferrule assembly is disposed in a plug frame such that an end portion of the ferrule, terminating at an end face, projects from one end of the plug frame and a strength member retention portion of a cable retention member is disposed over the barrel projecting from the other end. During termination, adhesive is inserted into a bore in the barrel followed by the insertion of a fiber until the fiber exits the ferrule assembly at the end face of the terminating ferrule. The fiber can then be cleaved and polished as necessary. Because of the curing process, and further because of the overall difficulties inherent in the use of adhesives, there is a desire to adapt the SC connector as well as other optical fiber connectors for use without adhesives or epoxies.

However, the adhesiveless or epoxiless configurations of the prior art often suffer from decreased optical performance as a result of "pistoning." Pistoning is the alternating expansion and contraction of the ferrule and/or barrel of a connector typically due to temperature variations. This expanding and contracting results in the longitudinal movement of the cleaved end of the fiber within the bore of the connector, specifically within the ferrule and relative to the end face. The negative effects of "pistoning" have been addressed with the implementation of fiber protrusion. Fiber protrusion refers to a cleaved end of a fiber that extends, or protrudes, beyond the end face of the ferrule of the connector. While this configuration reduces the negative effect of "pistoning" on the optical performance of the connector, the protruding fiber portion is exposed to debris and susceptible to cracks and breakage. Thus, a connector for use without adhesives or epoxies and that minimizes or eliminates "pistoning" without the need for fiber protrusion is desirable to the industry.

Thus, a heretofore unaddressed need exists in the industry to address the aforementioned deficiencies and inadequacies to produce an adhesiveless connector that is not subject to these drawbacks.

SUMMARY OF THE INVENTION

Certain advantages and novel features of the invention will be set forth in the description that follows and will become apparent to those skilled in the art upon examination of the following or may be learned with the practice of the invention.

The present invention is generally directed to a quick connect optical fiber ferrule connector that can be installed in the field without the use of adhesive or epoxy. The connector includes a ferrule having a receiving end, a terminating end, and a tapered ferrule bore disposed and extending therethrough. The tapered ferrule bore has a larger diameter toward the fiber receiving end than toward the connection or terminating end. Also included is a barrel having a barrel bore disposed therein. The barrel is arranged and configured to receive the receiving end of the ferrule such that the barrel bore and the ferrule bore are axially aligned. An insert having a receiving end, a support end, and a bore disposed therethrough is positioned such that the receiving end of the insert is disposed within the barrel bore and the support end of the insert is disposed within the tapered ferrule bore. The support end is compressible and the insert is tapered such as to correspond with the tapered ferrule bore.

The invention can be viewed as providing a method for installing a fiber optic connector in the field without using adhesives. In this regard, the method can be summarized broadly by the following steps. A ferrule assembly is provided having a ferrule disposed partially within a barrel such that a tapered ferrule bore is axially aligned with a barrel bore disposed within the barrel. An insert, having a bore disposed therethrough, is provided and slidably disposed within the tapered ferrule bore and the barrel bore. The insert has a taper that corresponds to the tapered ferrule bore. The insert includes a compressible support end. In the field, a fiber is inserted into the bore of the insert until the fiber exits the ferrule. Finally, the ferrule assembly is compressed longitudinally such that the ferrule is pushed further into the barrel and the insert moves toward the ferrule. The tapered bore of the ferrule compresses the support end of the insert thereby fixing the fiber in the ferrule assembly through the gripping action of the insert.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
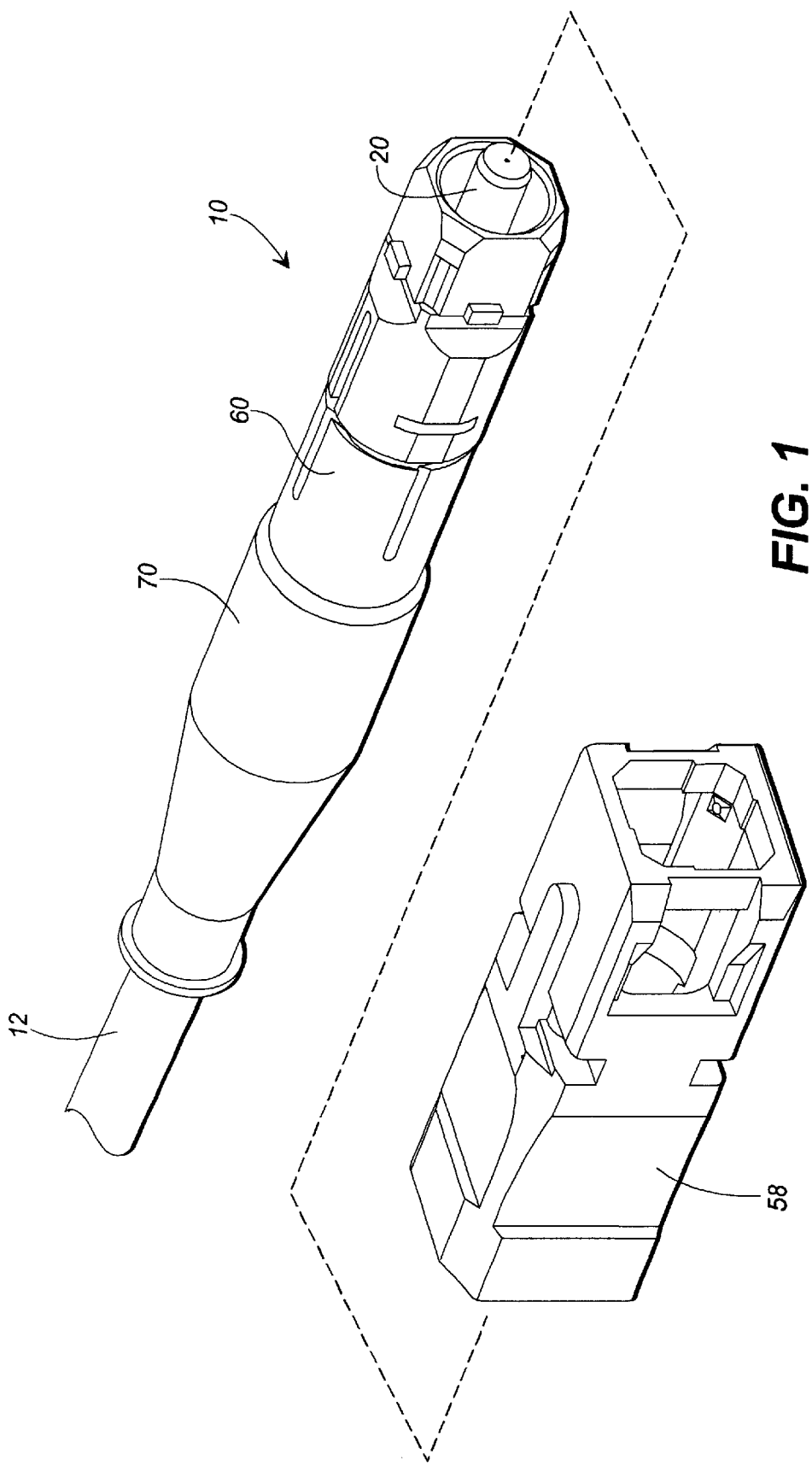
FIG. 1 is a perspective view of the assembled connector of the invention.

While the invention is susceptible to various modification and alternative forms, a specific embodiment thereof s shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Referring now to FIG. 1, there is shown an SC connector embodying the principles of the invention which is designated generally by the numeral 10. The connector 10 is adapted to terminate an optical fiber cable 12, containing a single fiber. The connector 10 can be engaged and surrounded by a plug frame 60 and supported by a cable strain relief, or boot 70. The plug frame 60 is configured to engage a grip 58. The SC connector and its assembly are disclosed in detail in U.S. Pat. No. 5,212,752, which is herein incorporated by reference. It should be appreciated that the principles of the invention disclosed herein can be applied to other known optical connectors, such as LC, ST, and FC varieties, and that the choice of an SC-type connector for the preferred embodiment is for illustrative purposes only.

Figure 2:
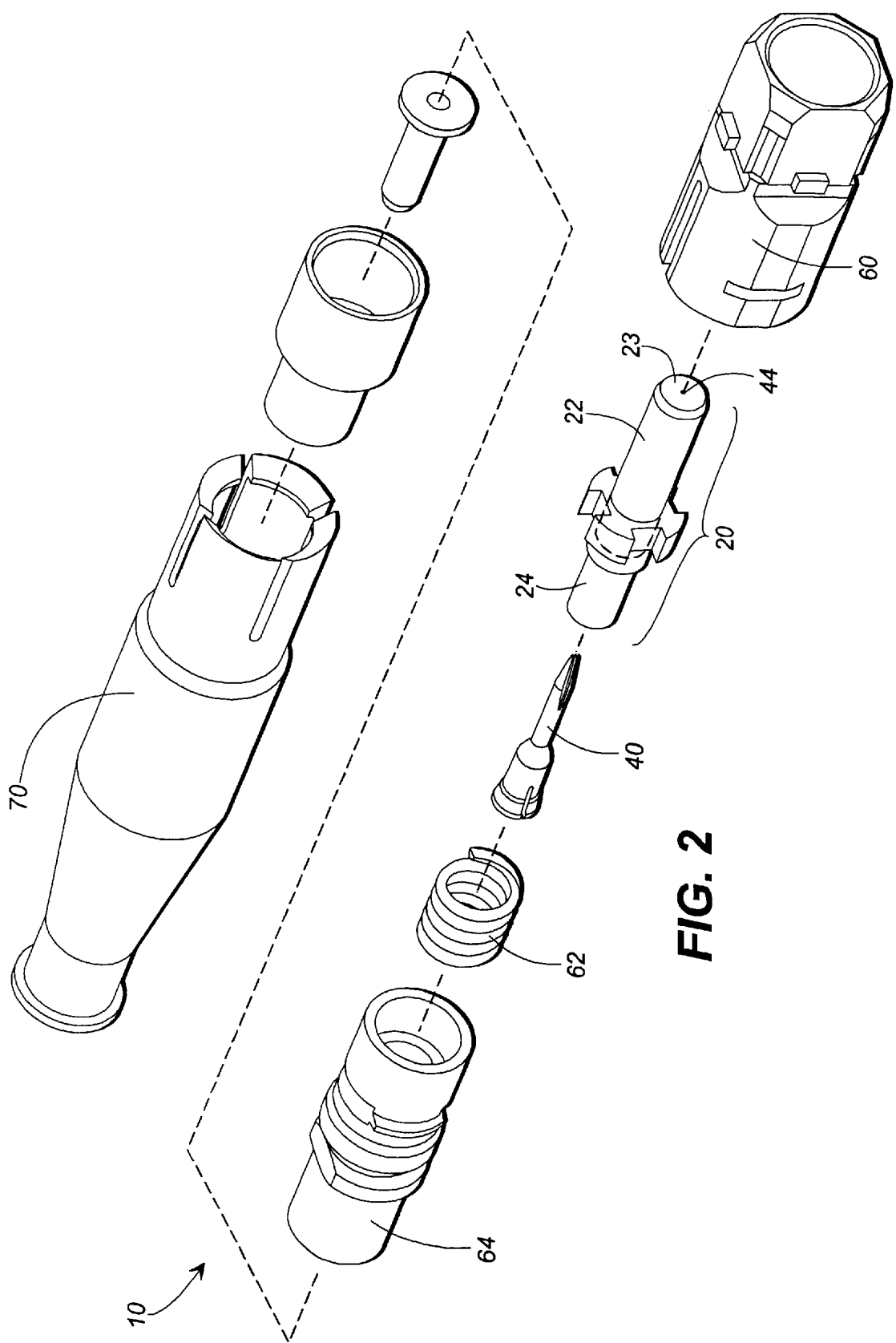
FIG. 2 is an exploded perspective view of the connector of FIG. 1.

FIG. 2 shows the internal elements and assembly of the connector 10 of the invention. It can be seen that the plug frame 60 houses a ferrule assembly 20 configured to be engaged by a spring 62. An insert 40 for gripping the fiber is disposed within the ferrule assembly 20. A cable retention member 64 is configured to receive both the spring 62 and the ferrule assembly 20. The cable retention member 64 can then be disposed within the plug frame 60. Once the ferrule assembly 20 and spring 62 are disposed inside the cable retention member 64, the cable retention member 64 can be snap-lock fitted into the plug frame 60.

Figure 3:
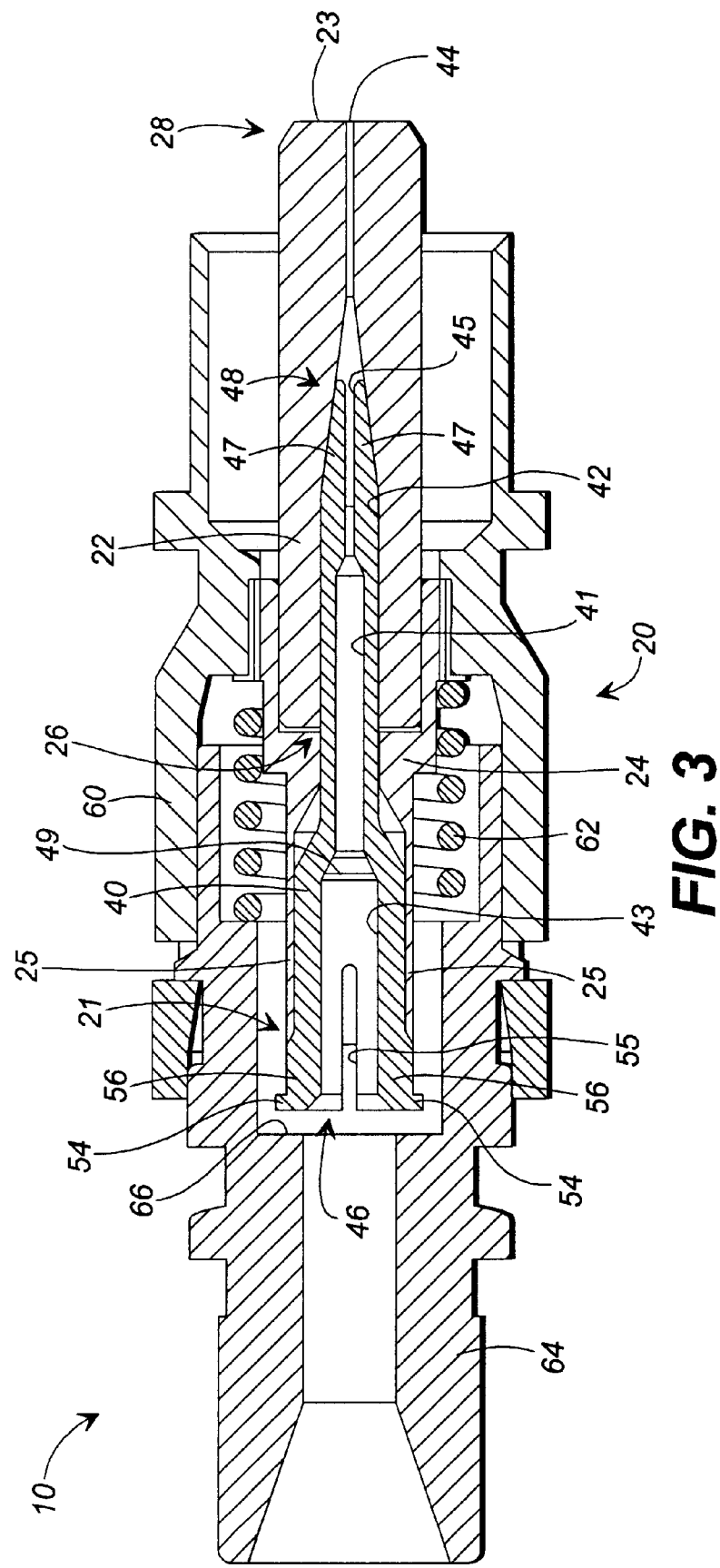
FIG. 3 is a cross-sectional view of the connector of FIG. 1.

Referring now to FIG. 3, illustrated is a cross-section of the assembled connector 10 of the invention. More specifically, the ferrule assembly 20 can be seen in greater detail. The ferrule assembly 20 includes a ferrule 22 and a barrel 24. The ferrule 22 has disposed therein a bore 42 which tapers to a relatively narrow substantially linear capillary 44. The ferrule 22 is defined by a receiving end 26 for receiving the fiber and a terminating end 28 which terminates the fiber. The bore 42 is tapered over a portion of its length to have a wider diameter toward the receiving end 26 of the ferrule 22 than toward the capillary 44. A portion of the bore 42 adjacent the receiving end 26 of the ferrule 22 is configure to receive an insert 40 and the capillary 44 is configured to receive a bare fiber. The capillary 44 runs from the narrowest portion of the bore 42 and intersects the end face 23 at the terminating end 28 of the ferrule 22. Preferably, the capillary 44 has a length of approximately 0.12 inches. A capillary 44 in this length range allows the fiber to be supported relatively close to the end face 23 of the ferrule 22. Supporting the fiber close to the end face 23 of the ferrule 22 reduces the "pistoning" of the fiber in the capillary 44, the elimination or reduction of which can provide for increased optical performance. The ferrule 22 preferably comprises a ceramic material, however, it can be comprised of any suitable material. The ferrule 22 is supported and received by the barrel 24.

The barrel 24 includes a receiving end 21, configured to receive the insert 40 and an opposing end arranged and configured to receive the ferrule 22. The barrel 24 preferably comprises stainless steel; however, it may be comprised of any suitable material, such as, but not limited to, plated brass.

Figure 4:
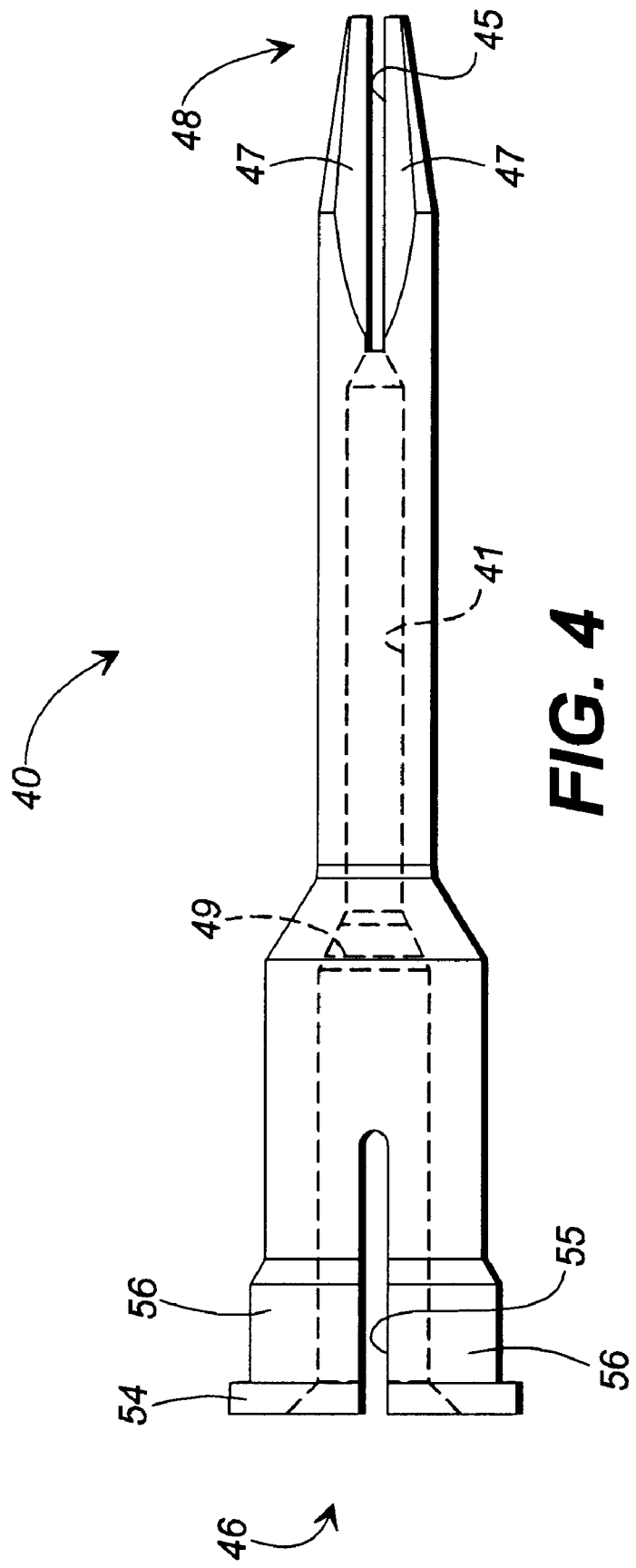
FIG. 4 is a side view of the insert of the connector of FIGS. 1–3.

Referring to FIG. 4 with continuing reference to FIG. 3, the insert 40 includes a receiving end 46, a support end 48, and a bore 41 disposed therebetween. The receiving end 46 is arranged and configured to receive a buffered optical fiber. The largest diameter portion of the bore 41, adjacent the receiving end 46 of the insert 40, extends to a seat 49 where the edge of the stripped buffer or jacket of the fiber to be terminated is seated when a fiber is properly inserted into the connector 10. The bore 41 narrows toward the support end 48 and is adapted to accommodate a stripped fiber. The support end 48 of the insert 40 corresponds to the taper of the bore 42 of the ferrule 22. The insert 40 includes a slot 45 disposed at the support end 48 and a slot 55 disposed at the receiving end 46. Although the slots 45–55 are illustrated as oriented in a horizontal plane, it should be understood that the slots 45–55 can be disposed having a plane of another orientation or the support end 48 and the receiving end 46 can include more than one slot disposed therein. The slot 45 provides space into which the portions 47—47 can bend or deform toward each other, thereby narrowing the bore 42 toward the support end 48. The narrowing of the bore 42 toward the support end 48 effectively grips and supports the fiber in place in the insert 40 when the connector 10 is crimped or compressed during termination by the tapered bore in the ferrule 22. The slot 55 disposed toward the receiving end 46 provides for a similar function as the slot 45 is disposed toward the support end 48. The slot 55 provides for the two portions 56—56 to be deformable toward each other, thereby gripping the buffer disposed around the fiber received into the connector 10. The insert 40 preferably comprises a plastic, preferably having low creep properties, or a metal material; however, the insert 40 can be comprised of any suitable material.

In use, the connector 10 is assembled, or premanufactured, prior to being shipped to the field. During assembly, the ferrule assembly 20 is assembled such that the portions 47—47 toward the support end 48 and the portions 56—56 toward the receiving end 46 are undeformed and remain substantially parallel to each other. A spring 62 is then disposed on the ferrule assembly 20 which is received by the cable retention member 64. The plug frame 60 is then snap-locked onto the cable retention member 64. The connector 10 can then be shipped to the field for a terminating use. During termination, typically in the field, a technician strips a portion of the fiber to be terminated by the connector 10 and inserts the fiber into the cable retention member 64 such that the fiber travels through the cable retention member 64 and into the bore 41 of the insert 40 at the receiving end 46. The fiber is inserted further into the bore 41 until the edge of the buffer that has been stripped from the fiber is seated against the seat 49 in the insert 40. The fiber extends past the support end 48 of the insert 40, into the capillary 44 of the ferrule 22 and out the terminating end 28 of the ferrule 22. A tool can then be used to crimp the fiber, thereby fixing the fiber within the connector 10. The tool for crimping (not shown) preferably supports the cable retention member 64 while applying on the end face 23 of the ferrule 22 a longitudinal force toward the cable retention member 64. As a result of this force the ferrule assembly 20 is displaced longitudinally toward the cable retention member 64 until the receiving end 46 of the insert 40 seats on a shoulder 66 of the cable retention member 64. The barrel 24 continues the longitudinal displacement and the spring 62 is compressed until a receiving sleeve 25 of the barrel 24 seats against the outwardly extended flanges 54 of the insert 40. The ferrule 22 displaces longitudinally wedging the support end 48 of the insert 40 into the tapered portion of the bore 42 within the ferrule 22. As the ferrule 22 slides further onto the insert 40, the tapered bore 42 of the ferrule 22 acts to compress the portions 47—47 of the insert 40 toward each other, thereby gripping and supporting the optical fiber therebetween. The receiving sleeve 25 of the barrel 24 acts to engage the portions 56—56 of the insert 40, thereby compressing the portions 56—56 toward each other and gripping the buffer of the fiber inserted into the connector 10. The fiber extending beyond the terminating end 28 of the ferrule 22 can then be cleaved and polished as necessary. The positioning of the support end 48 of the insert 40 and the capillary 44 of the ferrule 22 close to the end face 23 of the ferrule 22 provides for support of the optical fiber near the cleaved end. Such support is effective in cutting down on the phenomenon of "pistoning" thereby resulting in less loss in the connection and improved optical performance. The cable strain relief 70 or boot can then be slid over the connector 10 and the grip 58 can then be disposed over the connector 10 and boot 70. Although termination is described herein as implementing the use of a tool for crimping, it should be appreciated that any means for applying a suitable force is acceptable.

Although a preferred embodiment of the invention has been disclosed in detail herein, it will be obvious to those skilled in the art that variations and modifications of the disclosed embodiment can be made without departing from the spirit and scope of the invention as set forth in the following claims.

Therefore, having thus described the invention, at least the following is claimed:

1. An optical fiber connector for terminating a fiber cable having a buffered optical fiber therein wherein an end portion of the fiber has been stripped of its buffer, said connector comprising:

a ferrule having a receiving end, a terminating end, and a tapered ferrule bore therein having a larger diameter at said receiving end than at said terminating end;

a barrel having a barrel bore therein, said barrel being arranged and configured to receive at one end said receiving end of said ferrule wherein said bores of said barrel and said ferrule are axially aligned, said barrel bore forming a receiving sleeve at its second end;

an insert slidably disposed within said ferrule bore, said insert having a receiving end for receiving a buffered portion of the optical fiber and a support end for supporting the stripped portion of the optical fiber and an insert bore extruding therethrough, said insert bore having a tapered portion in the region of said receiving end forming a stop against which the buffer portion of the optical fiber bears when inserted in said insert bore;

said support end of said insert having tapered first resilient gripping members for gripping the unbuffered portion of the optical fiber, the taper of said first gripping member substantially matching the taper of said ferrule tapered bore;

said receiving end of said insert having second resilient gripping members for gripping the buffered portion of the optical fiber when deformed; and said insert member having an external portion at said receiving end adapted to bear against said receiving sleeve portion of said barrel for deforming said second resilient gripping members when said insert is moved tranlationally toward said support end, said barrel, said insert, and said ferrule being longitudinally displacable relative to each other.

2. An optical fiber connector as claimed in claim 1 wherein said ferrule is made of ceramic material.

3. An optical fiber connector as claimed in claim 1 wherein said insert comprises a slot at said support end providing space for said support end to deform, and a slot at said receiving end providing space for said receiving end to deform.

4. An optical fiber connector as claimed in claim 1 and further comprising:

a plug frame having a bore therein;

a spring, said spring being arranged and configured to receive said barrel; and a cable retention member, said retention member having a bore therein having a first shoulder for forming a seat for said spring and a second shoulder for forming a seat for said receiving end of said insert.

* * * * *